T. R. MORGAN.
Clutching Device for Punching-Machines.
No. 215,280.　　　　　Patented May 13, 1879.
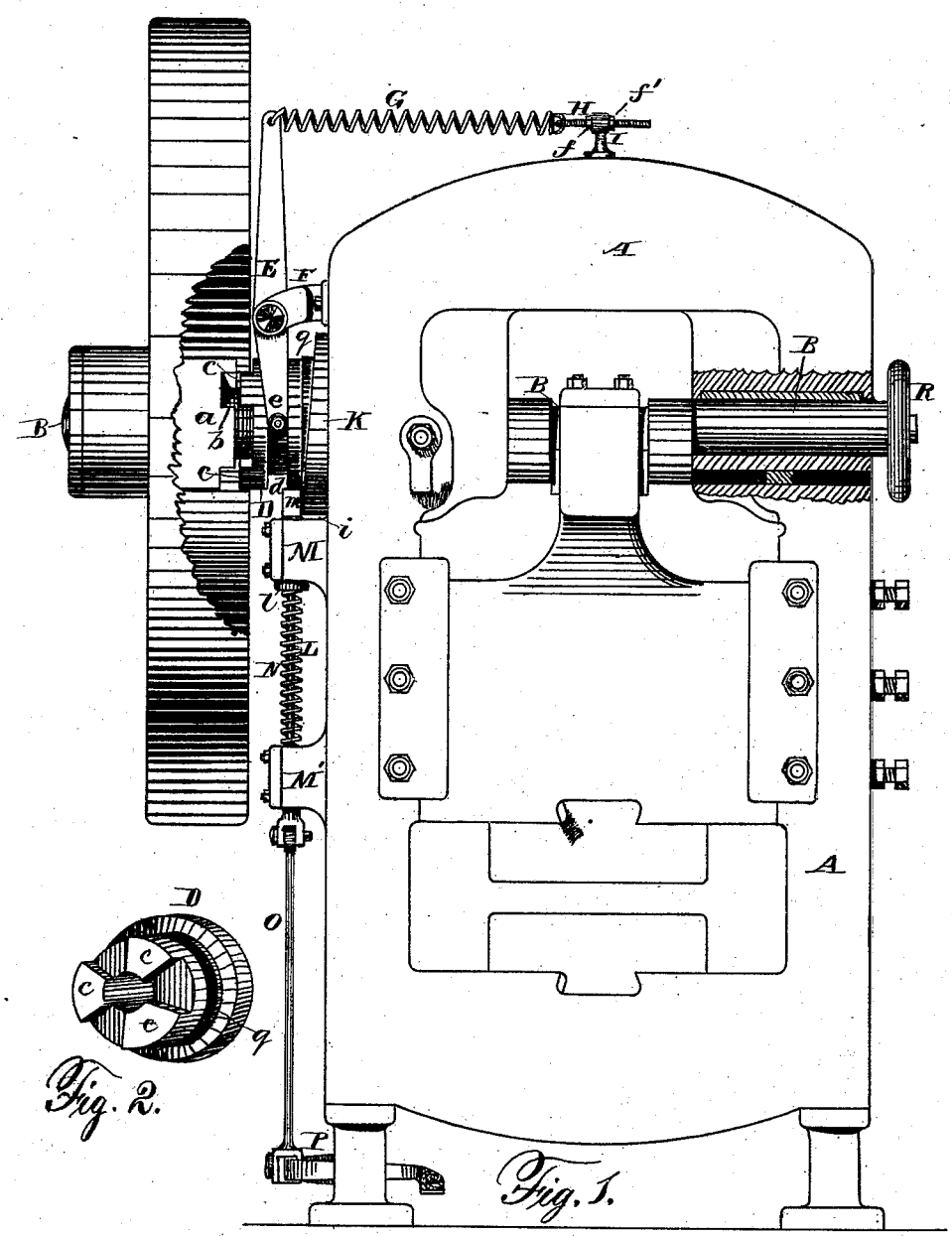

UNITED STATES PATENT OFFICE.

THOMAS R. MORGAN, OF ALLIANCE, OHIO.

IMPROVEMENT IN CLUTCHING DEVICES FOR PUNCHING-MACHINES.

Specification forming part of Letters Patent No. 215,280, dated May 13, 1879; application filed February 28, 1879.

*To all whom it may concern:*

Be it known that I, THOMAS R. MORGAN, of Alliance, in the county of Stark and State of Ohio, have invented certain new and useful Improvements in Clutches; and I do hereby declare the following to be a full, clear, and exact description of the invention, such as will enable others skilled in the art to which it pertains to make and use it, reference being had to the accompanying drawings, which form part of this specification.

My invention relates to an improvement in clutches, the object being to provide a clutch of such construction that it shall be kept in engagement with the driving-pulley or band-wheel by a spring or weight, and disengaged therefrom by removing the foot from a treadle, the several parts to be arranged in such a manner that the press or hammer to which it is applied may be always stopped at any particular portion of its stroke; and to this end my invention consists in the combination with a rotary shaft having a notched wheel or band-pulley loosely journaled thereon, of a sliding clutch provided with a face-cam and a ring on one end thereof, and a spring-actuated lever for moving the clutch toward the band pulley or wheel, and an independent shipper-rod, the end of which is adapted to automatically engage with the face-cam and move the clutch away from the band pulley or wheel, and also to engage with the ring and retain the clutch out of engagement when it is desired to set the punch or dies.

In the accompanying drawings, Figure 1 is a front view of a press provided with my improved clutch, and Fig. 2 is a view in perspective of the clutch.

A represents the frame of a power-press or hammer; B, the crank-shaft for operating the punch or hammer-block.

As my improved clutch is applicable to any form of machinery, an extended description of any particular form of construction of press or hammer is not necessary to impart a full understanding of my invention.

C is a band-pulley loosely journaled on the rotary shaft B, the inner face of the hub $a$ having any desired number of notches, $b$, formed therein. D is a clutch, the outer face of which is furnished with prongs $c$, corresponding in number, size, and form to the notches $b$ in the hub of pulley C. Clutch D is constructed with an annular groove, $d$, in which engage the ends $e$ of the bifurcated lever E, which latter is pivoted to a bracket, F, attached to the frame A. To the upper end of the lever E is secured one end of a spiral spring, G, the opposite end being attached to a screw-threaded adjusting-rod, H, which is supported in a bracket, I, and retained in any desired adjustment by means of the nuts $f f'$.

By turning the rod H away from the upper end of the lever E additional tension is imparted to the spring G, and hence the tension of the spring may be regulated, as desired.

It will be observed that the lever E and spring G operate to force the clutch D in engagement with the band-pulley, and, as the clutch is fixed to the shaft B in a non-rotating manner by the feather and groove, the wheel or pulley is locked to the shaft and rotates the same. To the inner end of the clutch a face-cam, K, is rigidly secured or formed solid therewith, the clutch and cam being secured to the shaft in such relative position to that of the crank or eccentric on the shaft B that when the crank or eccentric has reached its highest point—that is to say, when the punch or hammer has been raised by the actuating-shaft B to its highest point—the widest part, $i$, of the cam will be located immediately below the shaft, or at the lowest point of the cam. L is a shipper-rod supported in bracket-bearings M M′, and upheld by a spiral spring, N, which surrounds the rod, the upper end of said spring resting in contact with a pin or collar, $l$, fastened to rod L, and the lower end supported upon the upper surface of bracket M′. A connecting-rod, O, is pivoted at its upper end to the lower end of shipper-rod L, and at its lower end to the treadle P. When pressure is removed from treadle P the spring N raises the treadle, connecting-rod, and shipper, and forces the upper end, $m$, of the shipper-rod past the periphery of the cam, so that it will engage with its cam-face and serve as an abutment to impart an endwise movement to the cam and clutch.

A ring, $q$, is formed on the face of the cam, said ring being equal in width to the width of the cam; or, in other words, the ring is arranged at right angles to the clutch-sleeve, and one side or face of the same is flush with the highest point on the cam. This ring $q$ serves an important function in the operation of setting the dies and punches, which is required when the driving-pulley is in motion.

When the clutch has been thrown out of engagement with the driving-pulley the highest point of the clutch is located beneath the shaft.

To set the die and punch, the crank-shaft must be turned to move the punch downward into close proximity to the die, and for this purpose a hand-wheel, R, may be attached to the crank-shaft opposite the end to which the clutch is applied.

If no provision were made for retaining the clutch in its unlocked position for setting the punch, the crank-shaft, when turned, would rotate the cam, and allow the clutch to engage with the driving-pulley, which would thus impart a rapid movement to the punch, and not only effectually prevent the setting of the punch and die when the driving-pulley is in motion, but would be the cause of accidents and much damage should an attempt be made to perform such an operation without shipping the driving-belt onto a loose pulley. All such dangers and objectionable features are guarded against and effectually prevented by the employment of the ring $q$ in connection with the face-cam.

The roller or shipper-rod first engages with the depressed portion of the face of the cam, the end of the shipper-rod bearing against the periphery of ring $q$.

When the cam has traveled through half of a complete revolution to the point where the outer face of the ring $q$ merges into the face of the cam, the upper end of the shipper-rod moves upward, its end resting against the smooth portion of the clutch, while its side face bears against the outer face of the ring $q$. It will thus be observed that the clutch is securely held from lengthwise movement while the crank-shaft is being turned to set the dies and punches.

Having fully described the construction of my improved clutch, I will now describe its operation.

To start the press or hammer with which the clutch may be connected, the operator presses the treadle downwardly, which operates to withdraw the upper end of the shipper-rod from contact with any portion of the cam or clutch, and allows the spring-actuated lever to throw the clutch longitudinally on its shaft, and its prongs engage in the notches in the band-pulley, which is being continuously revolved. This operation locks the loosely-mounted band-pulley to the crank or actuating shaft of the machine through the intervention of the clutch, and thus sets the machine in motion.

To stop the machine it is simply necessary to remove the foot from the treadle, when the spring connected with the shipper-rod raises the latter, and causes the upper end thereof to engage with the face-cam and move the clutch endwise on the shaft, the parts being relatively constructed and arranged in such a manner that when the crank has reached its highest position the clutch will be completely disconnected, and hence the crank-shaft will be brought to a stand-still, with the punch-hammer, cutter, or other device connected therewith raised to its highest position. This feature of always stopping the machine at a single point in its movement is of great importance in practice, as it enables the operator to have immediate access to the die and punch or work being done without the necessity of turning the crank around by hand to the desired position.

It is obvious that many slight details in construction and arrangement of parts may be devised without departing from the spirit of my invention, as, for instance, the clutch may be thrown in and out of engagement by weights instead of a spring, and the weights be arranged on graduated arms or levers to regulate their power the same as effected by the springs shown and described. Other changes of a similar nature might be made, and hence I do not restrict myself to the exact construction shown and described; but, Having fully described my invention, what I claim as new, and desire to secure by Letters Patent, is—

The combination, with a shaft having a band wheel or pulley loosely journaled thereon, of a clutch provided with a face-cam and a ring-bearing, a spring-actuated lever for moving the clutch toward the band pulley or wheel, and an independent shipper-rod adapted to automatically engage with the face-cam and move the clutch away from the band pulley or wheel, and also to engage with the ring-bearing to retain the clutch out of engagement with the band wheel or pulley when it is desired to set the punch or dies, substantially as set forth.

In testimony that I claim the foregoing I have hereunto set my hand this 14th day of February, 1879.

THOS. R. MORGAN.

Witnesses:
JNO. R. MORGAN,
HENRY HEER.